L. E. BLANCHARD.
SHAFT COUPLING.
APPLICATION FILED MAY 18, 1910.
1,173,704.
Patented Feb. 29, 1916.
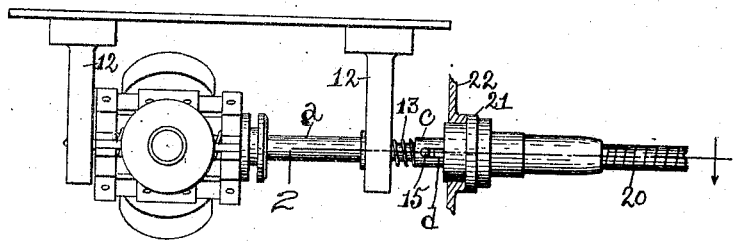
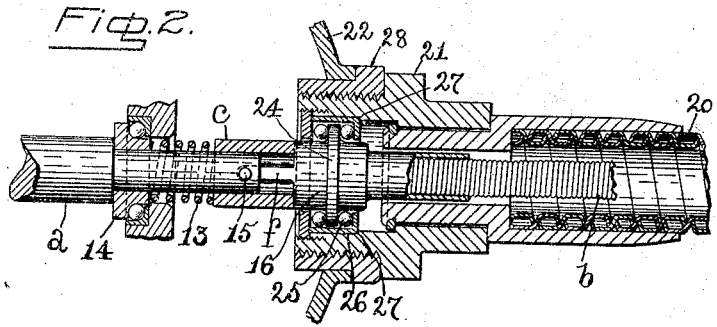
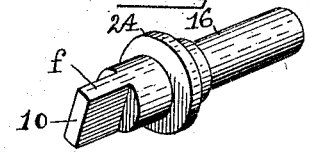
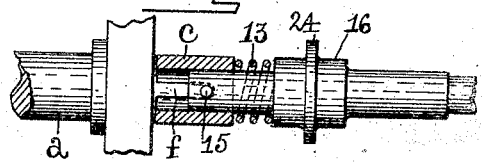
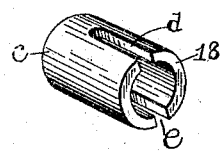
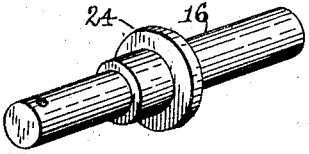
Witnesses.
M. G. Crozier
J. Murphy
Inventor,
Leon E. Blanchard
by Jas. H. Churchill
atty.

UNITED STATES PATENT OFFICE.

LEON E. BLANCHARD, OF BOSTON, MASSACHUSETTS, ASSIGNOR, BY MESNE ASSIGNMENTS, TO EDWARD T. NEWTON, OF HOLYOKE, MASSACHUSETTS.

SHAFT-COUPLING.

1,173,704.  Specification of Letters Patent.  Patented Feb. 29, 1916.

Application filed May 18, 1910. Serial No. 561,978.

*To all whom it may concern:*

Be it known that I, LEON E. BLANCHARD, a citizen of the United States, residing in Boston, county of Suffolk, and State of Massachusetts, have invented an Improvement in Shaft-Couplings, of which the following description, in connection with the accompanying drawings, is a specification, like letters on the drawings representing like parts.

This invention relates to a novel clutch or coupling device, which is especially designed and adapted for use on speedometers for connecting the main or governor shaft of the instrument with the flexible driving shaft commonly employed for connecting the instrument with a wheel of an automobile or other vehicle.

The invention has for its object to provide a simple, efficient and durable clutch with which the flexible driving shaft can be automatically coupled to the main or governor shaft of the instrument in a minimum time and with the least possible labor on the part of the operator, whereby inexperienced persons can easily effect the connection, and whereby danger of injuring or deranging the speedometer when connecting the flexible shaft thereto is avoided. To this end, I employ a clutch comprising a female member in the form of a sliding sleeve provided at one end with a transverse slot, and a male member consisting of a lug or nose piece, which is adapted to enter the transverse slot in the sleeve. The sliding sleeve is yieldingly backed up by a suitable spring, which normally forces the sleeve against a fixed stop and into position to be engaged by the coöperating member, which is made to engage the end of the sleeve and force the same back against the action of the spring, until in the rotation of one of said members, the slot and nose piece register, whereupon the spring forces the sleeve forward and causes the nose piece to enter the slot and thereby couple the two members together.

The invention is especially adapted for use with a flexible shaft having a practically fixed relation to its inclosing casing and the coupling employed to secure said casing to the casing of the speedometer, inasmuch as the yielding member of the clutch enables the coupling to be screwed into the casing of the instrument without danger of the head of the flexible shaft moving the governor shaft of the instrument out of its proper position.

These and other features of this invention will be pointed out in the claim at the end of this specification.

Figure 1 represents in elevation a sufficient portion of a speedometer and a flexible shaft coupled thereto by a clutch embodying this invention, to enable it to be understood. Fig. 2, a detail in longitudinal section on an enlarged scale to be referred to. Fig. 3, a detail to be referred to. Fig. 4, a modification to be referred to. Fig. 5, a detail of the shaft shown in Fig. 4, and Fig. 6, a detail of the slotted sleeve.

Referring to the drawing, *a* represents the main or governor shaft of a speedometer, which may be of any suitable or desired construction, and *b* the flexible shaft, which is now commonly used to connect the shaft *a* with the front wheel of an automobile or other vehicle whose speed it is desired to measure. In order that the flexible shaft *b* may be connected with the governor shaft *a* quickly and easily and also by inexperienced as well as experienced persons, and without danger of injuring the instrument, I have provided a clutch of novel construction, which has provision for automatic engagement of the said shafts and also has provision for movement of one of the clutch members longitudinally with relation to the other, as will be described. The clutch herein shown as embodying this invention is provided with a female member in the form of a sleeve *c* having at one end preferably diametrically opposite slots *d*, *e*, (see Fig. 6), which extend longitudinally of the sleeve for a portion of its length. The slots *d*, *e*, may be considered and will be hereinafter referred to as a single slot.

The male member of the clutch is made as a projection or nose piece *f* (see Fig. 3), which is adapted to enter the slot in the sleeve *c*, and which is provided at its end with a flat or square face 10 to engage the end of the said sleeve.

In Fig. 2, the sleeve *c* is shown as mounted on the end of the governor shaft *a* beyond one of the hangers 12 for the said shaft, and said sleeve has its slotted end normally projected beyond the end of the governor shaft by a helical spring 13, which is interposed between the rear or unslotted end of the sleeve and the cone 14 carried by the shaft. The slotted sleeve c is guided in its longitudinal movement on the governor shaft a by a pin 15 extended transversely through the said shaft and entering one or both of the diametrically opposite slots d, e, the said pin also serving as a stop to limit the forward movement of the sleeve by the spring 13.

The nose piece or male member f in the present instance is shown in Figs. 2 and 3, as forming the projecting end of a sleeve 16 fitted onto and constituting a head or tip for the flexible shaft b to revolve as a part thereof in any suitable manner and as now commonly practised.

The nose piece f as herein shown is made of a width substantially equal to the diameter of the sleeve c, and its flat or square face 10 is designed to abut against the square or flat end 18 of the sleeve so as to turn freely against the same, and independently thereof, until the said nose piece registers with the slots d, e, in the sleeve, whereupon the parts are in position to be coupled by longitudinal movement of the said sleeve on the governor shaft under the influence of the spring 13.

When it is desired to couple the flexible shaft b to the governor shaft a, with the clutch members arranged as shown in Fig. 2, the operator forces the nose piece f against the sleeve c so as to move the same back on its shaft a and thereby compress the spring 13, and the flexible shaft is then turned until the end of the nose piece f is brought into register with the slots d, e, in the sleeve c, whereupon the spring 13 moves the sleeve forward over the nose piece and thereby automatically couples or clutches the flexible shaft and the governor shaft together.

The flexible shaft b has a practically fixed relation against movement within its inclosing casing 20 and the coupling member 21 employed to secure the casing 20 to the casing 22 of the instrument, for the purpose of preventing accidental disengagement of the flexible shaft from the governor shaft, as, for instance, by stretching of the casing 20, which fixed relation is effected as herein shown by a flange or collar 24 on the tip or head 16 engaging balls 25 in a cup 26, which bears against a shoulder 27 on the interior of the coupling member 21.

The present invention is especially adapted for safe-guarding the speedometer instrument from injury when the coupling member 21 is screwed into its coöperating coupling member 28, which is soldered or otherwise fastened to the instrument, for when the nose piece f abuts against the end of the sleeve c as the coupling member 21 is screwed into the member 28, the sleeve c is forced back on the governor shaft until the nose piece f enters the slots d, e, after which further movement of the coupling member 21 moves the nose piece f toward the governor shaft a, which is arranged with relation to the casing of the instrument, so that the coupling member 21 is set up before the nose piece f reaches the governor shaft.

In Fig. 2, the sleeve c is shown as located on the governor shaft and the nose piece f on the flexible shaft, but it is not desired to limit the invention in this respect, as said parts may be reversed as shown in Fig. 4, wherein the nose piece f is attached to the governor shaft a, and the sleeve c and spring 13 are mounted on the head or tip 16 of the flexible shaft b.

I prefer to provide the sleeve c with two slots d, e diametrically opposite and to make the nose piece f of a width equal to the diameter of the sleeve, as by so doing, the nose piece has a double engagement with the sleeve, one on each side of the center thereof, and a strong and durable connection is obtained, but I do not desire to limit the invention in this respect, as a single slot as d may be used and the nose piece may be made sufficiently narrow to pass through this slot into the sleeve.

Claim:

The combination with a shaft, of a second shaft, a casing in which said second shaft is revoluble, means for supporting said second shaft in said casing, means for securing said second shaft in fixed position with relation to said casing to enable said second shaft to be moved with said casing in the direction of the length of said second shaft, and a coupling for automatically connecting said shafts together by movement of said casing toward the first-mentioned shaft, said coupling comprising a sleeve member movable longitudinally on one of said shafts and provided at one end with a longitudinally extended slot, a second member having a fixed relation to the other of said shafts and of a width greater than the inner diameter of said sleeve to enable it to engage one end of said sleeve and to enter the slot therein to couple the two members together, and a spring coöperating with the movable coupling member to effect engagement of the latter with the fixed coupling member when the latter registers with the slot in said sleeve member.

In testimony whereof, I have signed my name to this specification in the presence of two subscribing witnesses.

LEON E. BLANCHARD.

Witnesses:
JAS. H. CHURCHILL,
J. M. MURPHY.